(12) United States Patent
Smith, Jr.

(10) Patent No.: US 6,542,582 B1
(45) Date of Patent: Apr. 1, 2003

(54) FILTERING SIGNALS IN A CONFERENCE CALL ENVIRONMENT

(75) Inventor: James O. Smith, Jr., Marion, IA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/910,789

(22) Filed: Jul. 24, 2001

(51) Int. Cl.$^7$ .............................................. H04M 11/00
(52) U.S. Cl. ..................... 379/52; 379/88.14; 379/93.17
(58) Field of Search ................................. 379/52, 88.14, 379/93.15, 93.17, 93.01, 93.05, 93.07, 93.28, 400.08; 375/222

(56) References Cited

U.S. PATENT DOCUMENTS 6,307,921 B1 * 10/2001 Engelke et al. ............... 279/52

FOREIGN PATENT DOCUMENTS

JP                409149186 A   *  6/1997   ............ H04N/1/00

* cited by examiner

Primary Examiner—Melur Ramakrishnaiah

(57) ABSTRACT

A method for providing telephone services for the hearing-impaired includes establishing a conference call between a hearing-impaired party, a hearing party and a communication assistant. The hearing party sends a voice message to the communication assistant. The communication assistant converts the voice message into a corresponding text message and transmits the text message to the hearing-impaired party. The text message is displayed to the hearing-impaired party using a device that includes a modem. The modem outputs a synchronization tone in response to receiving the text message. The synchronization tone and other tones may then be filtered to ensure that they do not reach the communication assistant and the hearing party.

29 Claims, 4 Drawing Sheets

FILTERING SIGNALS IN A CONFERENCE CALL ENVIRONMENT

FIELD OF THE INVENTION

The present invention relates to filtering signals and, more particularly, to filtering signals in a conference call environment.

BACKGROUND OF THE INVENTION

A conventional telecommunication device for the deaf/teletype (TDD/TTY) enables people who are hard of hearing or deaf to communicate with other parties via standard telephone lines. For example, one way in which a deaf party may communicate with another party is if both parties use a TDD. In this case, a calling party may type using a standard keyboard included with the TDD and the called party reads the message on a display associated with his/her TDD. The called party may similarly type a message using his/her TDD and the calling party may read the message using his/her display.

A second way in which a hearing-impaired/deaf person may communicate via standard telephone lines is referred to as voice carry over (VCO). In this case, a conference call is established between a first party, a communication assistant (CA) (also referred to as a conference administrator) and a second party. The first party may be a deaf person who has a TDD/TTY and the second party may be a person with normal hearing who does not have a TDD/TTY device.

When the deaf party wishes to make a call, he/she dials a telephone number for the CA and tells the CA the telephone number to which he/she would like to be connected. The CA may dial the number and provide a greeting to the hearing party. When the hearing party speaks, the CA types what is slid and the deaf party reads the text using the TDD/TTY's display. The deaf party may respond to the message on the display by speaking to the hearing party, whereby the deaf party's voice is transmitted to the hearing party in a normal manner. In this manner, the deaf party may communicate with hearing and hearing-impaired parties using conventional telephone lines and conventional TDD/TTY equipment.

In the second scenario described above (i.e., VCO mode), a conference bridge is established to enable the three parties (the hearing-impaired party, the CA and the hearing party) to communicate. The hearing-impaired party's TDD/TTY includes a conventional modem for receiving the text messages from the CA. When the CA begins to type and the text data is transmitted to the TDD/TTY, the TDD/TTY modem responds with a synchronization (sync) tone. In typical systems, this sync tone is transmitted at a very high decibel level and is received at the conference bridge. As a result, both the CA and the hearing party receive the high decibel sync tone. This sync tone is extremely bothersome and even painful for the CA and the hearing party. Other annoying tones may also be transmitted from TDD/TTY echo path to the CA and the hearing party.

To combat the annoying sync tone and other tones from being transmitted to the CA and the hearing party, some systems terminate the receive leg of the connection from the conference bridge to the TDD/TTY each time the CA types. That is, the system breaks the receive connection between the conference bridge and the TDD/TTY to prevent signals from the TDD/TTY modem from reaching the conference bridge. In this case, the connection between the CA and the TDD/TTY modem remains in place so that the TDD/TTY can receive the text message from the CA. There are, however, several drawbacks with this approach.

For example, one drawback with this approach is that the automatic gain control (AGC) of the conference bridge goes into spasm when the connection is frequently broken and then re-established. That is, the conference bridge may first over-amplify and then over-attenuate the receive leg of the connection from the conference bridge to the hearing-impaired party when the connection is re-established. In addition, a loud pop often occurs on the conference bridge caused by the re-synchronization of the pulse coded modulated (PCM) data streams between the CA's modem and the TDD/TTY's modem.

Another drawback with terminating and re-connecting the connection from the TDD/TTY to the conference bridge is that the first word or words spoken by the hearing-impaired party when he/she responds to the CA?s text message is often clipped. That is, the hearing-impaired party's first word(s) are often not transmitted to the hearing party because the connection to the conference bridge is not re-established before the non-hearing party begins to speak.

SUMMARY OF THE INVENTION

There exists a need for a method and apparatus that improve problems associated with a conference call involving a TDD/TTY.

These and other needs are met by the present invention, where signals from a TDD/TTY device are filtered during a conference call. By selectively filtering transmissions from the TTD/TTY, the annoying/painful tones associated with a TDD modem are not transmitted to the CA and the hearing party.

According to one aspect of the invention, a method for providing telephone services for the hearing-impaired is provided. The method includes establishing a conference call between a hearing-impaired party, a hearing party and a communication assistant. The method also includes sending a voice message from the hearing party to the communication assistant, generating a text message by the communication assistant, the text message corresponding to the voice message and transmitting the text message. The method further includes receiving the text message by the hearing-impaired party using a device that includes a modem, the modem outputting a synchronization tone in response to receiving the text message. The method also includes filtering the synchronization tone so that the synchronization tone does not reach the communication assistant and the hearing party.

Another aspect of the present invention provides a computer-readable medium that includes stored sequences of instructions that are executed by a processor. The instructions cause the processor to allocate resources for maintaining a conference call between a hearing-impaired party, a hearing party and a communication assistant and pass a voice message generated by the hearing party to the communication assistant. The instructions also cause the processor to forward a text message generated by the communication assistant to the hearing-impaired party and receive a synchronization tone from a modem associated with the hearing-impaired party. The instructions further cause the processor to filter the synchronization tone so that the synchronization tone does not reach the communication assistant and the hearing party.

According to a further aspect of the invention, a device for facilitating communications with a hearing-impaired party is provided. The device includes a modem, a processing device coupled to the modem and a display. The modem is configured to receive data and the processing device processes the received data and outputs text data. The display receives the text data from the processing device and displays a message to the hearing-impaired party. The processing device is also configured to block data transmissions from the modem. having at least one predetermined frequency from being transmitted to another party.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

DETAILED DESCRIPTION

Systems and methods consistent with the present invention avoid the problems associated with conventional conference calls involving TDD/TTYs by filtering signals transmitted from the TDD/TTY modem. By filtering signals transmitted from the TDD/TTY modem, annoying tones are blocked without breaking the connection from the TDD/TTY to a conference bridge.

SYSTEM OVERVIEW

Figure 1:
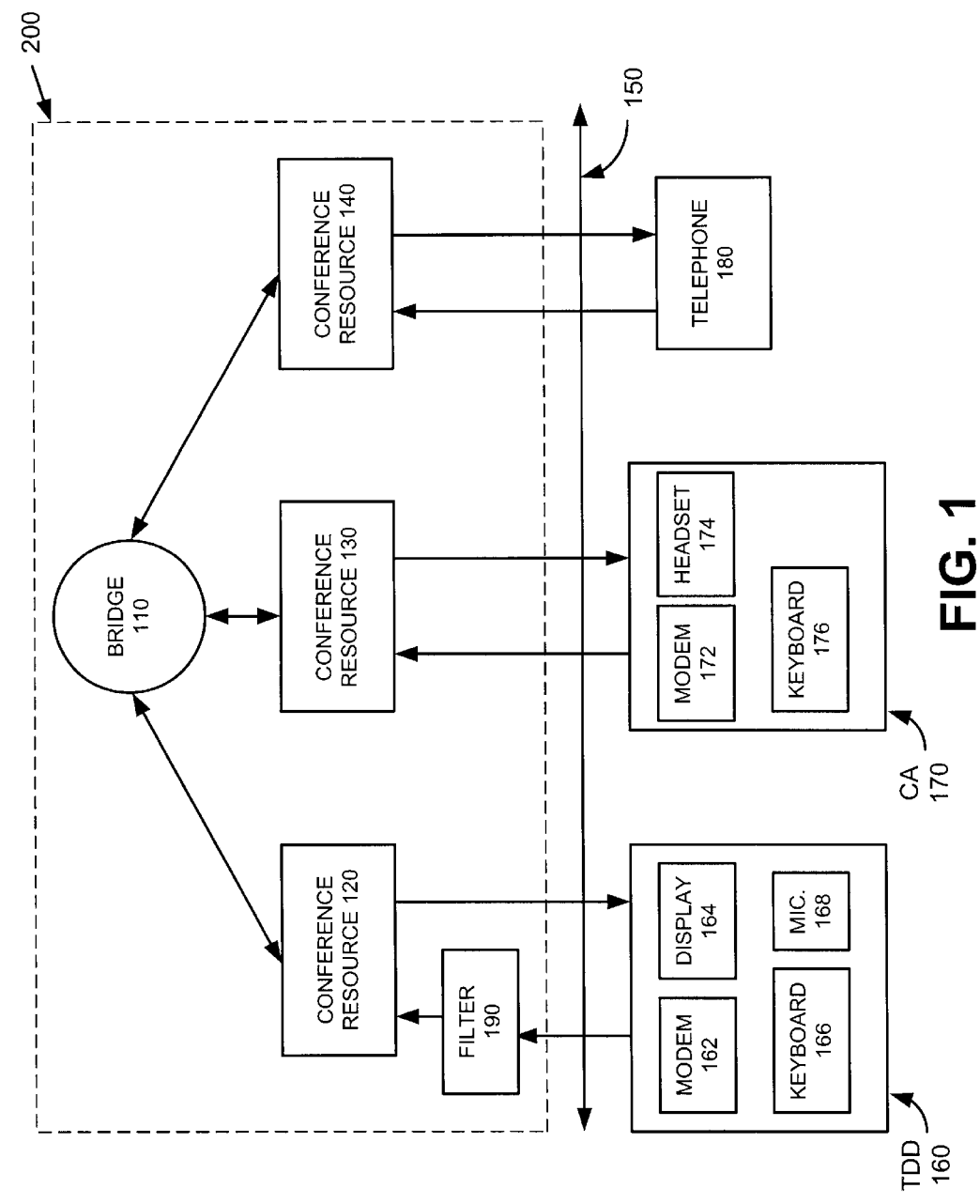
FIG. 1 is an exemplary system in which methods and systems consistent with the present invention may be implemented.

FIG. 1 is a block diagram of an exemplary system 100 in which methods and systems consistent with the present invention may be implemented. The system 100 includes a bridge 110, conference resources 120, 130 and 140, bus 150, TDD 160, CA 170, telephone 180 and filter 190. The exemplary configuration illustrated in FIG. 1 is for simplicity. It should be understood that other devices may be included in system 100 in implementations consistent with the present invention.

The bridge 110 may include a conventional conference bridge device that links multiple parties in a conference call. Conference resources 120, 130 and 140 represent conventional resources, such as the telephone circuits, switching devices, software or hardware controlled devices, etc., involved in completing the conference call for each of the respective participants. In the exemplary system 100, conference resource 120 is associated with a hearing-impaired party communicating via TDD 160, conference resource 130 is associated with CA 170 and conference resource 140 is associated with a hearing party communicating via telephone 180.

The bus 150 may be a time division multiplexed (TDM) bus that provides each of the parties involved in the conference call with a full-duplex connection to the respective conference resources 120–140. Alternatively, the connection between the bus 150 and one or more of the conference resources, such conference resource 120 may be half-duplex. In an exemplary implementation, bus 150 may represent a multi-vendor integration protocol (MVIP) bus, a signal computing system architecture (SCSA) bus or another type of bus. In each case, conference resources 120–140, TDD 160, CA 170 and telephone 180 may transmit/receive data to/from each other via bus 150.

The TDD 160 may be a conventional TDD/TTY device that includes a modem 162, a display 164, a keyboard 166 and a microphone 168. It should be understood that TDD 160 may include a bus (not shown) that interconnects some or all of the components of the TDD 160. It should also be understood that TDD 160 may include additional components, such as a processor or microprocessor (not shown) that processes information and controls the components of TDD 160. In an exemplary implementation, the TDD 160 may include an acoustic coupler that receives a conventional telephone handset. In this implementation, the microphone 168 may be the microphone portion of the telephone handset. When the user wishes to talk, he/she may pick up the telephone from the acoustic coupler and speak. When the user wishes to receive data from the CA 170, the user may place the telephone in the acoustic coupler, thereby activating the modem 162. In other implementations, the TDD 160 may be a conventional TTY with a display screen and a separate telephone handset.

The CA 170 may represent any conventional CA workstation and operator used in a VCO environment. In most jurisdictions, when a deaf party wishes to make a call to a hearing party without a TDD or when someone without a TDD wishes to call a deaf party, he/she uses a telephone number designated for CAs. The CA 170 may include a modem 172, a headset 174 and a keyboard 176. It should be understood that CA 170 may include a processor or microprocessor (not shown) that performs processing associated with transmitting data and a bus (not shown) that interconnects some or all of the components of the CA 170. It should also be understood that the CA 170 may include additional components, such as a display device (not shown) that displays information for the CA operator, such as information that he/she types via keyboard 176.

The telephone 180 represents a conventional telephone used by a hearing party to communicate with the CA 170 and the hearing-impaired party via bridge 110. The telephone may be a standard telephone, a cordless telephone, a cellular telephone or any other type of conventional telephone.

In an exemplary implementation consistent with the present invention, the CA 170 may receive a call from a hearing-impaired party. The CA may receive the telephone number of the party that the hearing-impaired party wishes to call and may complete a conference call to telephone 180 via bridge 10 in a conventional manner. The CA 170 may then listen for voice messages from the hearing party and types the corresponding messages via keyboard 176. The text message is transmitted from CA 170 via modem 172. The TDD modem 162 receives the text message and displays the text via display 164.

The filter 190 may represent a voice frequency (VF) filter that is designed to pass normal VF signals and filter out signals having one or more specific frequencies. According to an exemplary implementation consistent with the present invention, the filter 190 receives data streams from the TDD 160 and performs a filtering process on the received data streams. In an exemplary implementation, the TDD 160 transmits data streams onto bus 150 and filter 190 receives these data streams via the bus 150. The filter 190 may then perform its filtering process, as described in more detail below.

According to an exemplary implementation consistent with the present invention, all or some of the components of the bridge 110, conference resources 120–140 and filter 190 may be implemented in a host device or controlled by a host device, indicated by the dotted lines and labeled 200 in FIG. 1. The host device 200 may provide the platform for establishing and maintaining the conference call between the hearing-impaired party, the CA operator and the hearing party, in addition to filtering signals from the TDD 160, as described in more detail below.

Figure 2:
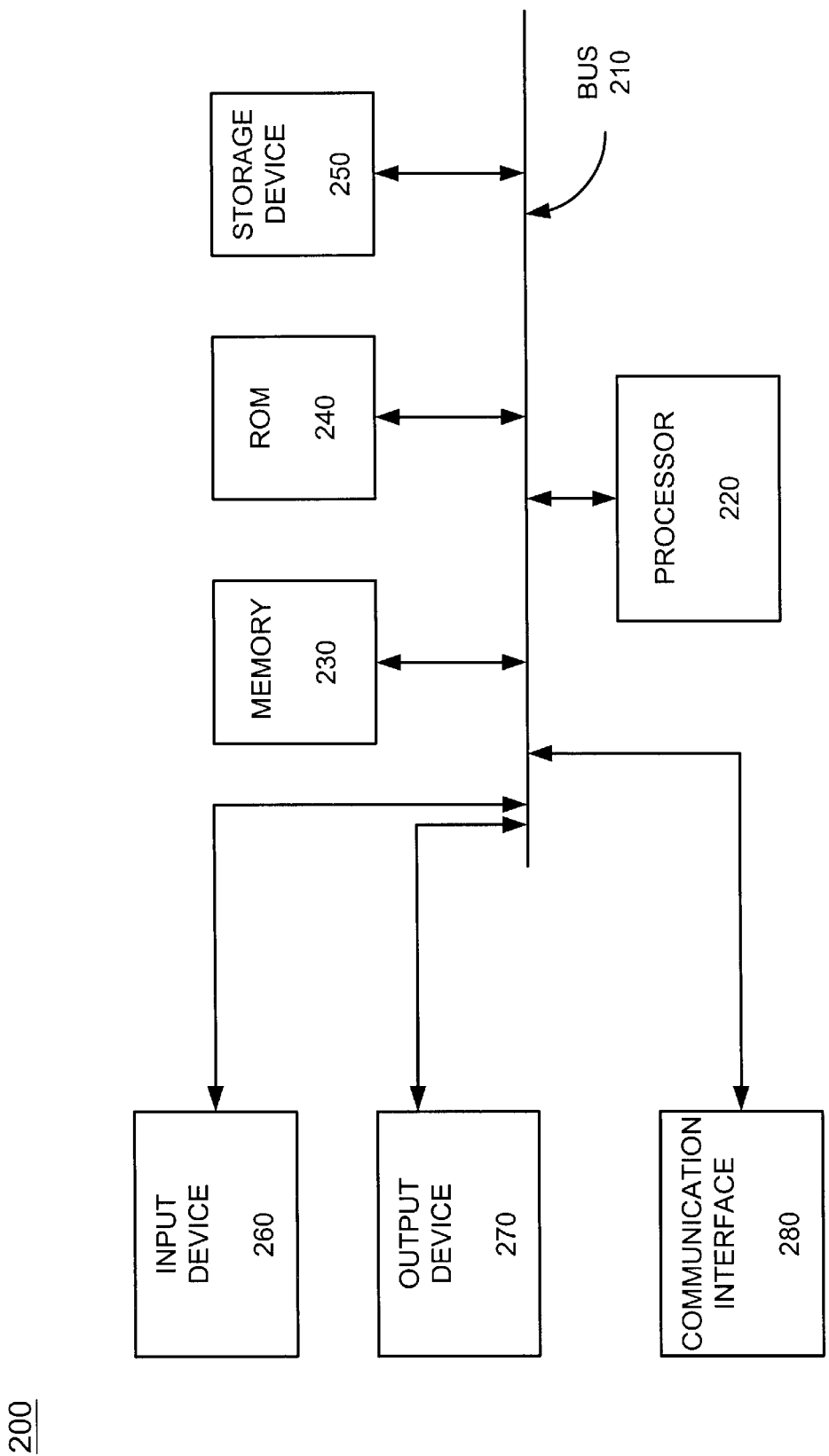
FIG. 2 is a block diagram of an exemplary host, device in which systems and methods consistent with the present invention may be implemented.

FIG. 2 illustrates an exemplary host device 206 in which systems and methods consistent with the present invention may be implemented. The host device 200 includes a bus 210, a processor 220, a memory 230, a read only memory (ROM) 240, a storage device 250, an input device 260, an output device 270, and a communication interface 280. The bus 210 permits communication among the components of the host device 200.

The processor 220 may include any type of conventional processor or microprocessor that interprets and executes instructions. The memory 230 may include a random access memory (RAM) or another dynamic storage device that stores information and instructions for execution by the processor 220. Memory 230 may also be used to store temporary variables or other intermediate information during execution of instructions by processor 220.

ROM 240 may include a conventional ROM device and/or another static storage device that stores static information and instructions for processor 220. The storage device 250 may include a magnetic disk or optical disk and its corresponding drive and/or some other type of magnetic or optical recording medium and its corresponding drive for storing information and instructions.

The input device 260 may include any conventional mechanism that permits an operator to input information to the host device 200, such as a keyboard, a mouse, a pen, voice recognition and/or biometric mechanisms, etc. The output device 270 may include any conventional mechanism that outputs information to the operator, including a display, a printer, one or more speakers, etc. The communication interface 280 may include any transceiver-like mechanism that enables the host device 200 to communicate with other devices and/or systems. For example, the communication interface 280 may include a modem or an Ethernet interface to a LAN. Alternatively, communication interface 280 may include other mechanisms for communicating via a network.

The host device 200, consistent with the present invention, provides a platform through which a conference call may be established between TDD 160, CA 170 and telephone 180. According to an exemplary implementation, the host device 200 performs processing associated with establishing and maintaining the conference call in response to processor 220 executing sequences of instructions contained in memory 230. Such instructions may be read into memory 230 from another computer-readable medium, such as a data storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the.present invention. Thus, the present invention is not limited to any specific combination of hardware circuitry and software.

EXEMPLARY PROCESSING

Figure 3:
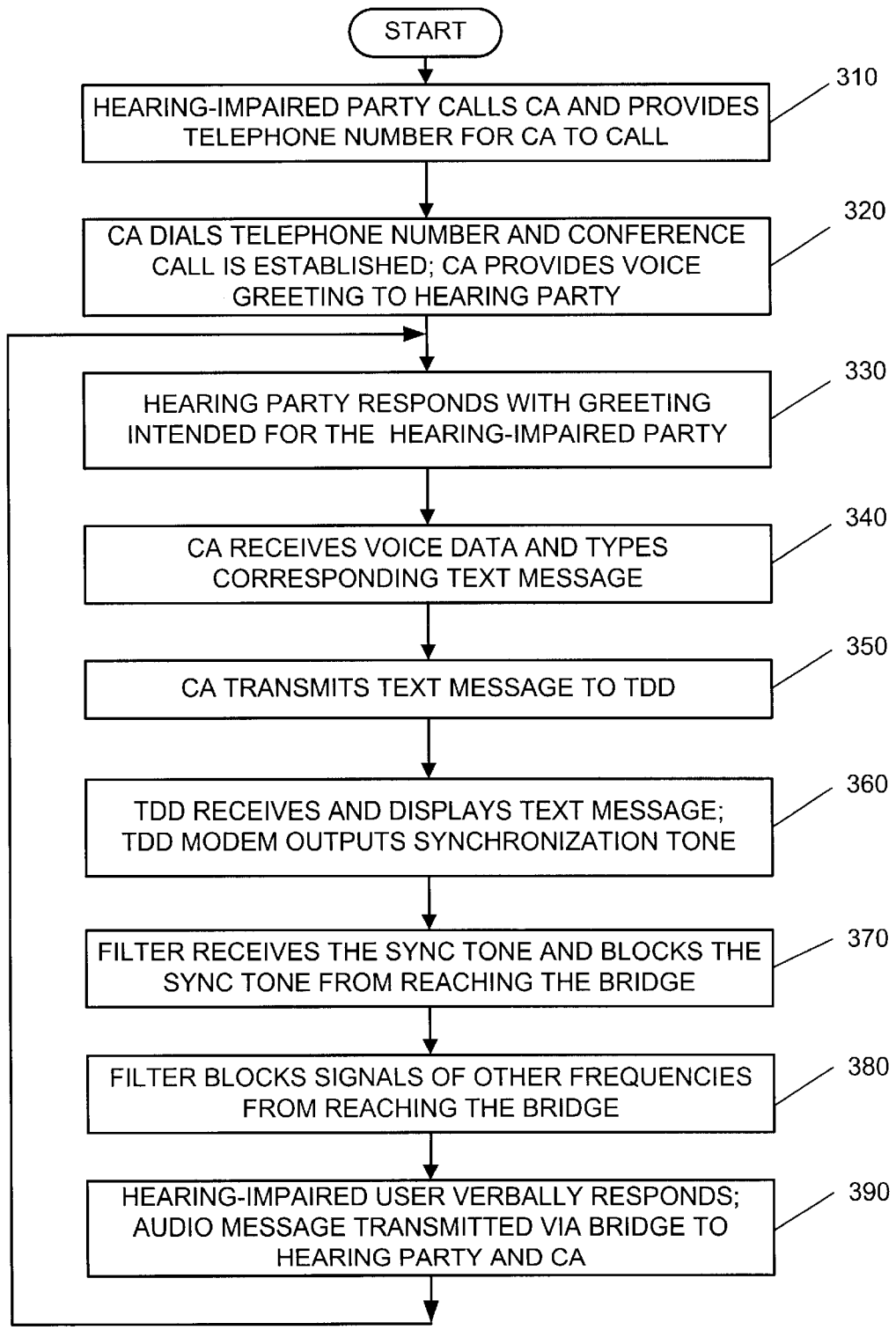
FIG. 3 is an exemplary flow diagram, consistent with the present invention, illustrating processing associated with a conference call.

FIG. 3 is an exemplary flow diagram, consistent with the present invention, illustrating processing associated with communications between a non-hearing party using TDD 160, a CA 170 and a hearing party using telephone 180. Assume that the hearing-impaired party wishes to make a telephone call. In this example, processing begins when the hearing-impaired party makes a telephone call to CA 170 (act 310). After the call to the CA 170 is completed, the hearing-impaired party may verbally provide the telephone number that he/she wishes to call (act 310). The CA 170 may then dial the number-of the desired party. In the example illustrated in FIG. 1, assume that the CA 170 dials the telephone number associated with telephone 180.

The responsible service provider (e.g., the local telephone company, a long distance telephone provider, etc.) establishes a conference call between the three parties via bridge 110 (act 320). In an exemplary implementation, the host device 200 allocates and controls conference resources 120–140 and bridge 110 to establish and maintain the conference call. After the connection to the hearing party is established, the CA 170 may provide a voice greeting to the hearing party informing the hearing party that a telephone call from a hearing-impaired person is to commence (act 320). The CA 170 may also provide the name and other information relating to the hearing-impaired party.

The hearing party may respond with a verbal greeting intended for the hearing-impaired party (act 330). The CA 170 receives the audio message via headset 174 and types the corresponding message using keyboard 176 (act 340). After typing the message, or while the CA 170 is typing the message, the CA modem 172 receives and begins transmitting the text message to bus 150 for transmission to TDD 160 (act 350). In an exemplary implementation, the text message from the CA modem 172 may be transmitted via bus 150 to conference resource 130 and on to bridge 110. Bridge 110 may then route the text message to TDD 160 via conference resource 120 and bus 150. It should be understood that in alternative implementations, the message from the CA modem 172 to TDD 160 may be routed in other ways.

The TDD modem 162 receives the text message and after processing by the TDD 160, the text message is displayed for the hearing-impaired user on display 164 (act 360). The TDD modem 162, consistent with the present invention, may also output a synchronization tone when it begins receiving data from CA 170 (act 360). The sync tone is normally used to synchronize data transmission/reception between two modems. According to an exemplary implementation, the sync tone may have a frequency of about 1150 Hz.

The TDD modem 162 transmits the sync tone via bus 150 to filter 190. In an exemplary implementation, the filter 190 receives the sync tone, determines that the sync tone has a frequency of 1150 Hz and blocks the 1150 Hz sync tone from being passed to the conference resource 120 and bridge 110 (act 370). This prevents the sync tone from being transmitted to the CA 170 and telephone 180. According to an exemplary implementation, the filter 190 may be designed to block signals having a frequency of 1150 Hz plus or minus some value. That is, the filter 190 may be designed to take into consideration variances in equipment, tolerances, etc. For example, the filter 190 may block signals having a frequency of 1150 Hz±10 Hz. In this case, the filter 190 determines the frequency of signals it receives and when the signal is between 1140 and 1160 Hz, the filter 190 blocks the signal from being transmitted to conference resource 120 and ultimately, from being transmitted to other parties via bridge 110.

Filter 190, consistent with the present invention, may also block signals having other frequencies (act 380). For example, TDD modem 162 may transmit data via a frequency shift keying (FSK) scheme at frequencies of 1400 Hz and 1800 Hz, respectively. That is, the FSK scheme may transmit a series of "1s" and "0s" at frequencies of 1400 Hz and 1800 Hz, respectively.

In a normal VCO environment, the hearing-impaired deaf party is supposed to respond to text displayed on his/her display 164 by providing normal audio responses. That is, the hearing-impaired party is not supposed to respond by using the keyboard 166. If for some reason, however, the hearing-impaired party begins typing via keyboard 166, the TDD modem 162 will transmit the data and the CA 170 and hearing party will hear high decibel tones associated with these data transmissions. Therefore, in order to avoid these tones from reaching the CA 170 and the hearing party, the filter 190 may also determine if signals having a frequency of either 1400 or 1800 Hz plus or minus some value (e.g., 10 Hz) are being transmitted from TDD 160. If the filter 190 determines that signals having these frequencies (i.e., 1400 or 1800 Hz) are being transmitted from TDD 160, filter 190 may block these transmissions as well.

In this manner, if TDD modem 162 begins transmitting either sync tones or transmissions associated with data entered via keyboard 166 after the conference call is established, the filter 190 will block these signals from reaching the bridge 110.

When the hearing-impaired party wishes to respond to the text message displayed on display 164 in the intended manner in a VCO environment, he/she may provide a normal audio response via microphone 168 (act 390). The microphone 168, consistent with the present invention, may be the microphone portion of a conventional telephone handset. As discussed previously, according to one implementation, the TDD 160 many include a conventional telephone handset that sits in an acoustic coupler when the hearing-impaired user wishes to receive text messages. When the hearing-impaired user wishes to answer the message, he/she picks up the telephone handset from the acoustic coupler and verbally responds. This audio message may be transmitted to the hearing party and the CA 170 via bridge 110 (act 390). Since the filter 190 is only designed to block frequencies of about 1150 Hz and to optionally block frequencies of about 1400 Hz and 1800 Hz, the large majority of the normal voice frequencies will pass through to bridge 110 to the hearing party and the CA 170.

The process may then return to act 330 and each time the hearing party responds, the CA types a text message and transmits the text message to the TDD 160. The filter 190 also remains active to ensure that sync tones and other tones from the TDD modem 162 are not transmitted to the other parties via bridge 110.

Referring back to FIG. 1, the filter 190 is shown as a separate component. Filter 190, as described in relation to FIG. 2 and according to an exemplary implementation of the present invention, may be implemented in software. In this implementation, the processor 220 performs an algorithm that determines the frequency of incoming signals and blocks the signals having the designated frequencies from passing to the bridge 110. One of ordinary skill in the art would be able to develop such an algorithm using conventional digital signal processing techniques based on the description given herein. It should be understood, however, that filter 190 may also be implemented in hardware.

Figure 4:
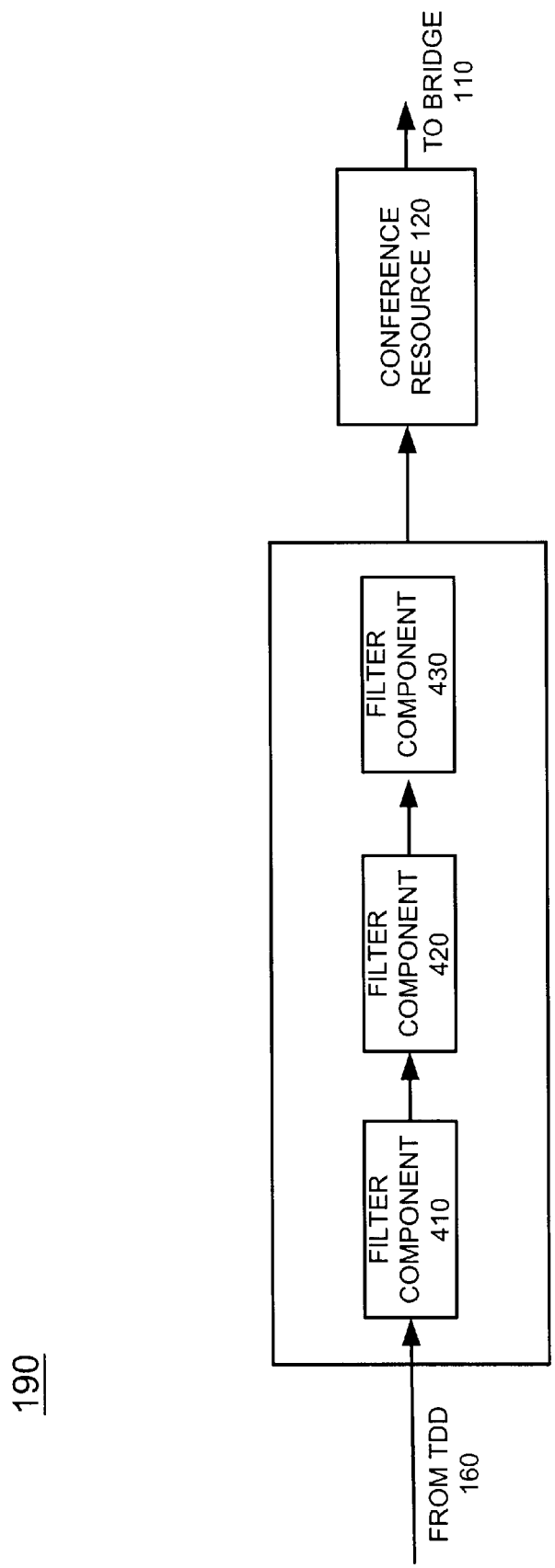
FIG. 4 is an exemplary diagram of the filter of FIG. 1 consistent with an implementation of the present invention.

For example, FIG. 4 illustrates an exemplary filter 190, consistent with a hardware implementation of the present invention. The filter 190 includes filter components 410, 420 and 430 coupled in series. Filter components 410–430 each include circuitry designed to "notch out" (i.e., block) signals of a particular frequency or range of frequencies.

In an exemplary implementation consistent with the present invention, filter component 410 filters out signals that have a frequency of about 1150 Hz. That is, the filter component 410 blocks signals having a frequency of about 1150 Hz±10 Hz from reaching conference resource 120 and ultimately, from being routed to the CA 170 and telephone 180 via bridge 110.

In addition, as described previously, TDD modem 162 may transmit data using a FSK scheme in which a series of "1s" and "0s" may be transmitted at frequencies of 1400 Hz and 1800 Hz. In this implementation, filter component 420 may block signals having a frequency of about 1400 Hz (e.g., 1400±10 Hz) and filter component 430 may block signals having a frequency of about 1800 Hz (e.g., 1800±10 Hz).

In this manner, filter 190 blocks signals having specific frequencies, while letting other voice frequencies pass through the filter 190. In this manner, filter 190 may selectively filter out annoying sync tones, other tones transmitted from the TDD 160 and echo tones, thereby ensuring that the CA 170 and the hearing party do not receive high decibel tones from TDD 160.

In the hardware implementation illustrated in FIG. 4, the filter 190 may be located at the location of the entity responsible for establishing the conference call. Alternatively, the filter 190 may be located at the TDD 160. In this case, a user's conventional TDD 160 may be retrofitted to include the filter 190. Alternatively, the filter 190 may be inserted in the TDD 160 at the time of manufacturing. A switch could also be installed in the TDD 160 or retrofitted to the TDD 160 so that the user can bypass the filter 190 when the TDD is being used in a non-VCO, environment (i.e., the user is communicating with another hearing-impaired user with a TDD). The switch could also be used when the TDD 160 is first starting up and synchronization with the CA modem 172 may be necessary.

In any event, the details of the circuitry in filter components 410, 420 and 430 are not illustrated in FIG. 4. One of ordinary skill in this art, however, would know how to design the particular circuitry based on the particular frequencies that the respective filter components 410–430 are designed to block. For example, conventional resistor, inductor, capacitor (RLC) circuits may be used to filter out the desired frequency(ies). Thus, the present invention is not limited to any specific combination of hardware circuitry.

In the manner described above, a TDD/TTY, user may use his/her TDD/TTY in a VCO mode while ensuring that annoying tones from the TDD/TTY modem are not transmitted via the conference call.

Systems and methods consistent with the present invention facilitate communications between hearing-impaired parties and hearing parties. An advantage of the invention is that hearing users are not forced to endure frequent and annoying tones associated with a TDD modem. Another advantage is that the present invention allows full time VCO routing of the receive connection from a conference bridge to a TDD/TTY. That is, the present invention does not break any connections to the conference bridge, thereby ensuring that none of the voice message from the hearing-impaired party is clipped while a connection is re-established. This results in more reliable and accurate conversations between hearing-impaired parties, the CA and hearing parties and increases satisfaction with the VCO service. Avoiding frequent re-synchronizing will also increase VCO throughput since the time spent re-synchronizing the TDD/TTY device is reduced. In addition, reducing the number of times that the TDD/TTY modem is re-synchronized enables the line levels to remain stable, thereby reducing character garble.

Still another advantage of the invention is that the system is flexible and can be easily modified. For example, in a software implementation, a programmer can reprogram the processor 220 to filter out any desired frequency, thereby avoiding costly field time associated with replacing existing equipment.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, the present invention has been described with the example of a TDD modem transmitting signals having frequencies of 1150 Hz (sync tone), 1400 Hz and 1800 Hz (1s and 0s). The present invention may also be used to filter signals having other frequencies. For example, if standards associated with TDD devices change or a particular TDD device transmits signals having other frequencies, the filter 190 may be configured to block out the desired frequencies. In addition, if the standard frequencies associated with transmissions from a TDD/TTY modem in another country is different than those discussed above, the filter 190 may be adjusted to filter the desired frequencies.

In addition, the present invention has been described with the example of a hearing-impaired party initiating a telephone call to a hearing party. The acts described in relation to FIG. 3 are similarly applicable if the hearing party initiates the call to a hearing-impaired party.

What is claimed is:

1. A method for providing telephone services for the hearing impaired, comprising:
   establishing a conference call between a hearing impaired party, a hearing party and a communication assistant;
   sending a voice message from the hearing party to the communication assistant;
   generating a text message by the communication assistant, the text message corresponding to the voice message;
   transmitting the text message;
   receiving the text message by the hearing impaired party using a device that includes a modem, wherein the modem outputs a synchronization tone in response to receiving the text message; and
   filtering the synchronization tone so that the synchronization tone does not reach the communication assistant and the hearing party.

2. The method of claim 1, wherein the filtering the synchronization tone includes:
   filtering tones having a frequency of about 1150 hertz.

3. The method of claim 1, further comprising:
   filtering signals from the modem corresponding to the frequencies used by the modem to transmit data.

4. The method of claim 3, wherein the filtering signals from the modem includes:
   filtering signals having a frequency of about 1400 hertz and 1800 hertz.

5. The method of claim 1, further comprising:
   displaying the text message on a display device;
   transmitting a voice message from the hearing impaired party to the hearing party; and
   receiving the voice message by the hearing party, the voice message being received without being clipped.

6. The method of claim 1, wherein the receiving the text message by the hearing impaired party occurs without terminating a connection from the modem to a conference abridge device.

7. The method of claim 1, wherein the device includes at least one of a telecommunications device for the deaf (TDD) and a teletype (TTY) device and the establishing includes:
   establishing a voice carry over (VCO) conference call.

8. A system, comprising:
   a device configured to facilitate communications with a hearing impaired or deaf party, the device comprising:
      a modem for receiving data, and
      a display for displaying text messages corresponding to the received data; and
   a filter coupled to the modem, the filter configured to:
      block data transmissions from the modem having at least one predetermined frequency, wherein the at least one predetermined frequency includes the frequency of a synchronization tone generated by the modem.

9. The system of claim 8, wherein the synchronization tone has a frequency of about 1150 hertz.

10. The system of claim 8, wherein the at least one predetermined frequency further includes the frequency used by the modem to transmit data.

11. The system of claim 8, wherein the at least one predetermined frequency further includes at least one of 1400 hertz and 1800 hertz.

12. The system of claim 8, wherein the filter comprises:
   a first filter component configured to block transmissions of a first frequency, the first frequency corresponding to the frequency of the synchronization tone generated by the modem,
   a second filter component configured to block transmissions of a second frequency, the second frequency corresponding to the frequency used to transmit binary ones, and
   a third filter component configured to block transmissions of a third frequency, the third frequency corresponding to the frequency used to transmit binary zeros.

13. The system of claim 8, further comprising:
   a bridge configured to link the device with a hearing party and a third party, the third party providing assistance to the hearing impaired party by converting audio messages from the hearing party into text messages.

14. The system of claim 13, wherein the bridge is configured to link the device, the hearing party and the third party in a voice carry over environment.

15. A computer-readable medium having stored thereon a plurality of sequences of instructions, said sequences of instructions including sequences of instructions which, when executed by a processor, cause said processor to:

allocate resources for maintaining a conference call between a hearing impaired party, a hearing party and a communication assistant;

pass a voice message generated by the hearing party to the communication assistant;

forward a text message generated by the communication assistant to the hearing impaired party;

receive a synchronization tone from a modem associated with the hearing-impaired party; and filter the synchronization tone so that the synchronization tone does not reach the communication assistant and the hearing party.

16. The computer-readable medium of claim 15, wherein when filtering the synchronization tone, the instructions cause the processor to:

filter tones having a frequency of about 1150 hertz.

17. The computer-readable medium of claim 15, including instructions for further causing the processor to:

filter signals from the modem corresponding to at least one frequency used by the modem to transmit data.

18. The computer-readable medium of claim 17, wherein when filtering signals from the modem, the instructions cause the processor to:

filter signals having a frequency of about 1400 hertz and 1800 hertz.

19. The computer-readable medium of claim 15, including instructions for causing the processor to:

receive a voice message from the hearing impaired party; and forward the voice message to the hearing party without blocking any portion of the voice message.

20. The computer-readable medium of claim 15, wherein when forwarding the text message, the instructions cause the processor to:

forward the text message without terminating a connection associated with the hearing-impaired party.

21. The computer-readable medium of claim 15, wherein when allocating resources, the instructions cause the processor to:

allocate resources for a voice carry over (VCO) conference call.

22. A device for facilitating communications with a hearing impaired party, the device comprising:

a modem configured to receive data;

a processing device coupled to the modem, the processing device configured to:
process the received data, and
output text data; and a display configured to:
receive the text data from the processing device, and
display a message to the hearing impaired party;

wherein the processing device is further configured to:
block data transmissions from the modem having at least one predetermined frequency from being transmitted to another party, wherein the at least one predetermined frequency includes the frequency of a synchronization signal generated by the modem in response to receiving data.

23. The device of claim 22, wherein the at least one predetermined frequency further includes the frequency used by the modem to transmit data.

24. The device of claim 22, further comprising:

a switch configured to control an operating mode of the device, wherein when the switch is in a first state, the device operates as a standard telecommunications device for the deaf (TDD) or teletype (TTY) and when the switch is in a second state, the device operates in a voice carry over mode; wherein the processing device does not block transmissions from the modem when the switch is in the first state.

25. A device for facilitating communications with a hearing impaired party, the device comprising:

a modem configured to receive data;

a display configured to display the received data; and a filter coupled to the modem, the filter being configured to:
block data transmissions from the modem having at least one predetermined frequency from being transmitted to another party, wherein the at least one predetermined frequency includes the frequency of a synchronization signal generated by the modem in response to receiving data.

26. The device of claim 25, wherein the at least one predetermined frequency further includes the frequency used by the modem to transmit data.

27. The device of claim 25, further comprising:

a switch configured to control an operating mode of the device, wherein when the switch is in a first state, the device operates as a standard telecommunications device for the deaf (TDD) or teletype (TTY) device and when the switch is in a second state, the device operates in a voice carry over mode; wherein the filter does not block transmissions from the modem when the switch is in the first state.

28. A method for providing voice carry over telephone services for the hearing impaired, the method comprising:

establishing a conference call between a hearing impaired party, a hearing party and a third party;

passing a voice message generated by the hearing party to the third party;

forwarding a text message generated by the third party to the hearing impaired party;

receiving a synchronization tone from a modem associated with the hearing-impaired party; and preventing the synchronization tone from reaching the hearing party and the third party.

29. The method of claim 28, further comprising:

filtering signals from the modem corresponding to at least one frequency used by the modem to transmit data.

* * * * *